(12) United States Patent
Holmes

(10) Patent No.: US 6,343,214 B1
(45) Date of Patent: Jan. 29, 2002

(54) MOBILE TELEPHONES

(75) Inventor: Gary Holmes, Hampshire (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/340,723

(22) Filed: Jun. 29, 1999

(30) Foreign Application Priority Data

Jun. 30, 1998 (GB) .............................................. 9814146

(51) Int. Cl.$^7$ ................................................ H04M 1/66
(52) U.S. Cl. ...................... 455/411; 455/415; 455/466; 380/43; 380/247; 380/270
(58) Field of Search ................................ 455/466, 575, 455/70, 72, 410, 411, 412, 414, 415, 461, 462; 380/247, 270, 93, 278, 271

(56) References Cited

U.S. PATENT DOCUMENTS

| | | | | |
|---|---|---|---|---|
| 4,467,140 A | * | 8/1984 | Fathauer et al. ............. | 455/462 |
| 4,843,385 A | * | 6/1989 | Borras .................... | 340/825.32 |
| 5,249,230 A | * | 9/1993 | Mihm, Jr. .................... | 380/23 |
| 5,329,591 A | | 7/1994 | Magrill | |
| 5,457,737 A | * | 10/1995 | Wen .......................... | 455/110 |
| 5,598,459 A | * | 1/1997 | Haartsen ..................... | 455/411 |
| 5,673,317 A | | 9/1997 | Cooper | |
| 5,875,404 A | * | 2/1999 | Messiet ....................... | 455/558 |
| 5,889,861 A | * | 3/1999 | Ohashi et al. .............. | 380/247 |
| 5,907,803 A | * | 5/1999 | Nguyen ....................... | 455/410 |
| 5,909,491 A | * | 6/1999 | Luo ............................ | 380/21 |
| 5,913,175 A | * | 6/1999 | Pinault ........................ | 455/558 |
| 5,933,773 A | * | 8/1999 | Ishida .......................... | 380/49 |
| 5,943,614 A | * | 8/1999 | Obayashi et al. ........... | 455/411 |
| 6,161,012 A | * | 12/2000 | Fenton et al. ............... | 455/432 |

FOREIGN PATENT DOCUMENTS

| | | |
|---|---|---|
| EP | 562890 A | 9/1993 |
| EP | 0 748 727 | 12/1996 |
| EP | 789500 A | 8/1997 |
| EP | 0 836 340 | 4/1998 |
| GB | 2 222 | 3/1990 |
| GB | 2 301 | 12/1996 |

OTHER PUBLICATIONS

UK Patent Office Search Report.

* cited by examiner

Primary Examiner—William Trost
Assistant Examiner—Congvan Tran
(74) Attorney, Agent, or Firm—Burns, Doane, Swecker & Mathis, L.L.P.

(57) ABSTRACT

A mobile telephone comprises reception means (5) for receiving message data including identity data, key data and instruction data from a caller, the identity data relating to the caller and the key data relating to the called unit, memory means (7) for storing caller identity data and associated stored security data, data processing means (6) for combining received identity and key data to produce received security data and comparison means (6) for comparing the received security data with stored security data relating to the received identity data, and for processing the instruction data if the received security data is equivalent to the stored security data, or for rejecting the instruction data if the received and stored security data are not equivalent.

8 Claims, 3 Drawing Sheets

MOBILE TELEPHONES

The present invention relates to mobile telephones and, in particular but not exclusively, to mobile telephones which are able to send and receive short text messages using the short message service provided by GSM Mobile Telephone Standards.

DESCRIPTION OF THE RELATED ART

The GSM short message service (SMS) can be used by base stations and mobile units within a network to interrogate and gain information form a target mobile unit, and can be used to change operational settings of the mobile unit.

Such information could be related to the geographical position of the mobile station, or details of the current cell site in which the mobile station is operating. Some operational settings which may be modified could include details of closed user group numbers, call forwarding or barring details etc.

It is therefore desirable to provide a system in which short messages (SMs) that are intended to make operational changes or request information from a mobile unit are encoded to prevent fraudulent use.

SUMMARY OF THE PRESENT INVENTION

According to one aspect of the present invention, there is provided a method of operating a mobile telephone comprising:

receiving message data including identity data, key data and instruction data from a caller, the identity data relating to the caller;

combining the identity data and key data to produce received security data;

obtaining stored security data from a memory of the telephone on the basis of the received identity data;

comparing the received security data with the stored security data; and processing the instruction data if the received security data is equivalent to the stored security data, or rejecting the instruction data if the received and stored security data are not equivalent.

DETAILED DESCRIPTION OF THE PREFERRED EMBODIMENT

Figure 1:
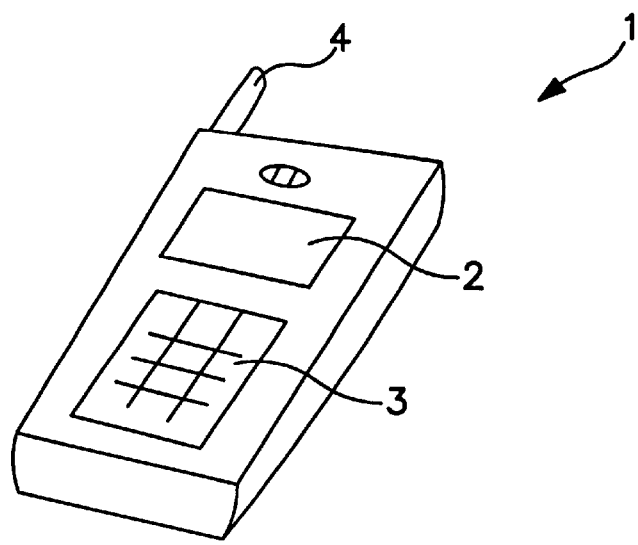
FIG. 1 shows a schematic view of a mobile telephone.

A mobile telephone 1 is shown in FIG. 1 and includes a display 2 and a keypad 3. As is well known, the GSM mobile telecommunications standard provides for the transmission and reception of short text messages (short message SM) between stations in the mobile network using the short message service (SMS). Short messages can be used to obtain information regarding a mobile station and can be used to change operational settings of a mobile station.

Figure 2:
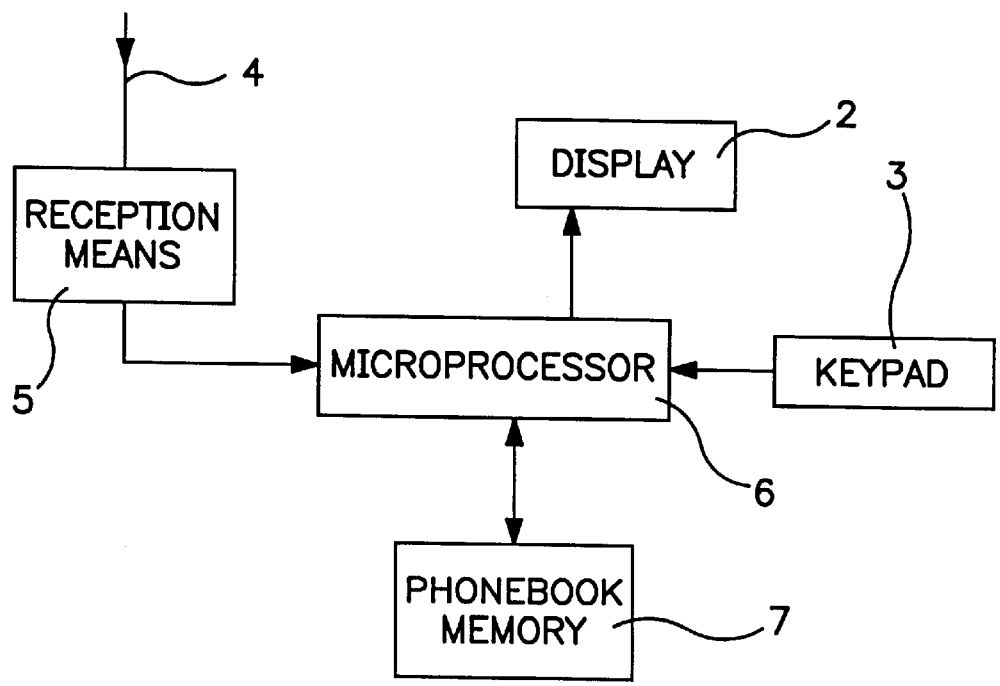
FIG. 2 shows a block diagram of parts of a mobile telephone embodying the present invention.

With reference to FIG. 2, a mobile telephone 1 includes a display 2, a keypad 3, and an antenna 4. The antenna 4 is connected to transmit/receive means 5 which operate to send and receive signals via the mobile telephone network. A micro-processor 6 controls the functions of the mobile telephone, and is connected to receive and transmit signals via the transmit/receive means 5. In addition, the mobile telephone incorporates a memory 7 which is used to store phone book entries for the user of the telephone. A typical entry in the phone book memory 7 comprises a person's telephone number combined with the name of that person.

Figure 3:
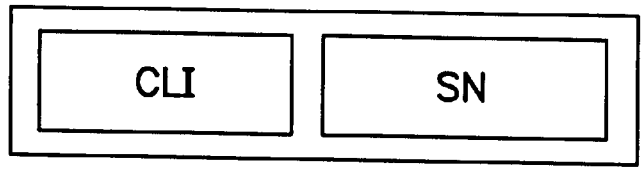
FIGS. 3 and 4 illustrate a stored data entry and a short message respectively.

In an embodiment of the present invention, a security number (SN) is stored in the phone book memory 7. The security number is associated with the number of a caller who is entitled to interrogate the mobile station. This phone book entry is shown schematically in FIG. 3, where the calling part's number is shown as CLI (calling line identifier) and the security number as SN.

Figure 4:
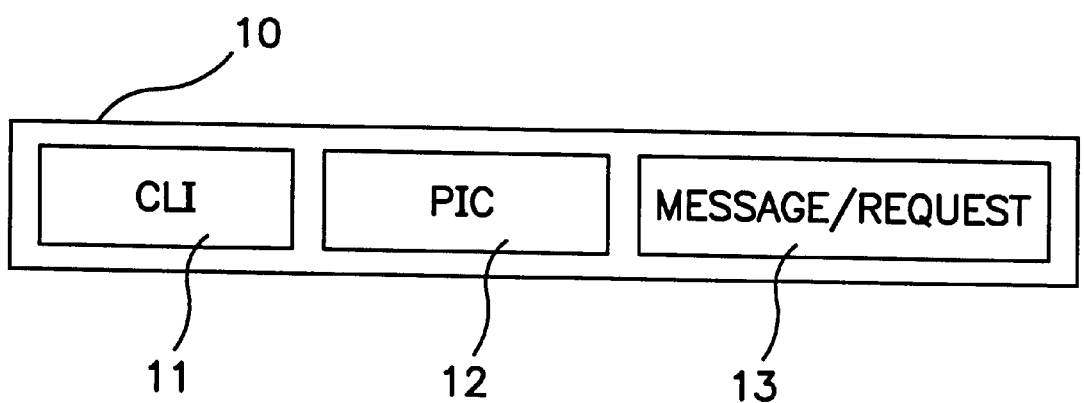

In systems operated in accordance with the present invention, when a station within the mobile network wishes to interrogate another station by way of the short message service (SMS), a short message (SM) is sent from that station to the station of interest. The contents of the short message are shown schematically in FIG. 4. The short message comprises a portion indicating the number of the calling station, a personal identification code which is unique to the station being called, and a message 13. As will be described below, the calling station's number 11 is used in combination with the personal identification code 12 to determine a received security number. This received security number is then compared with the stored security number associated in the phone book of the called station with the caller's number in order to determine whether the message 13 can be processed by the mobile unit.

For example, the algorithm combines the personal identity code (PIC) (eg. a four digit number), with the international telephone number of the requesting station. Such an international telephone number is usually 13 or 14 digits long. The algorithm produces a security number which can contain letters and numbers. The algorithm preferably operates in a similar way to known automatic password generators.

Figure 5:
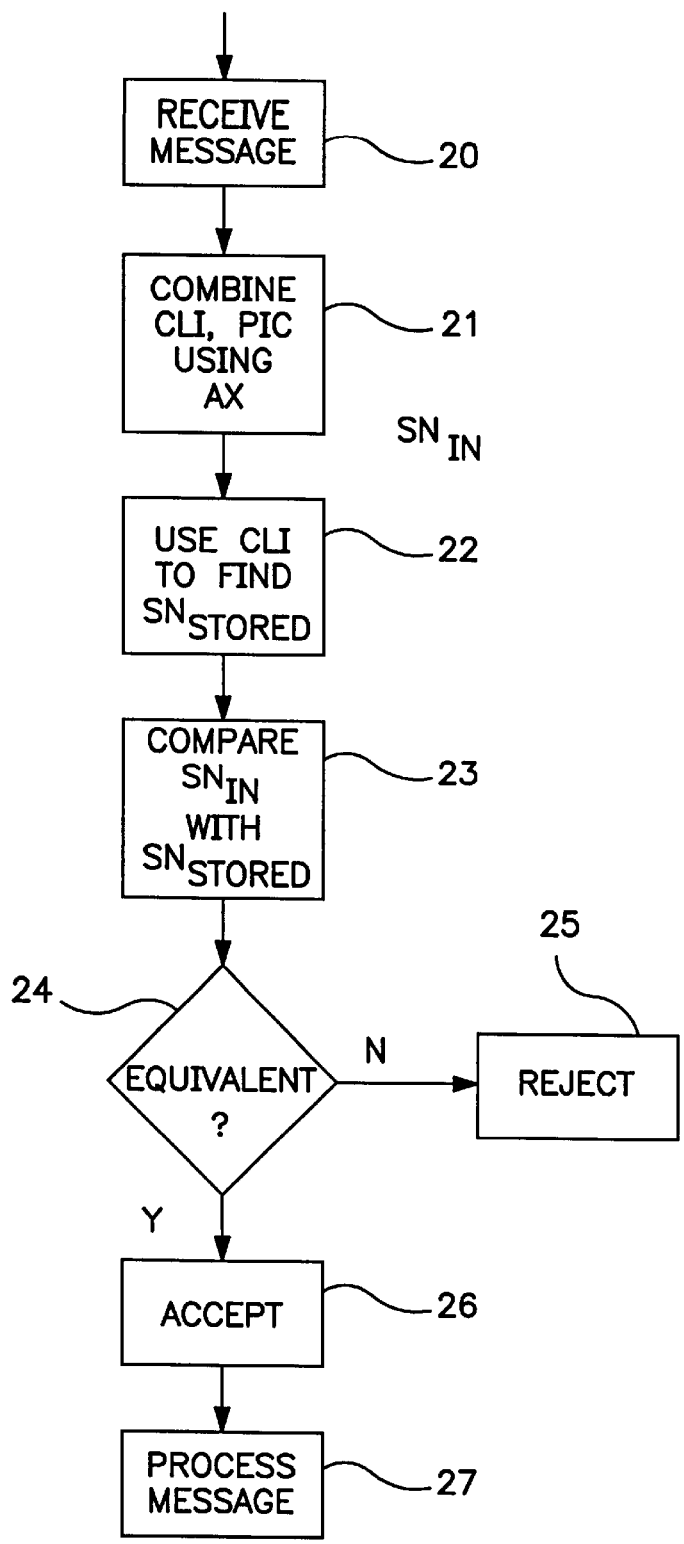
FIG. 5 is a flow chart illustrating steps in a method embodying the present invention.

With reference to FIG. 5, the mobile unit 1 receives a short message (20) including the caller's number and the mobile unit's personal identity code. The calling line identity number and personal identity code (PIC) are combined using an algorithm known only to the mobile unit concerned, to produce a so-called received security number. The called line identity number 11 of the incoming message is used to identity an entry in the phone book memory 7, and that phone book entry is used to provide the stored security number for the particular calling station.

The PIC is selected by the user in a preferred embodiment of the present invention, and is therefore unique to each mobile telephone. The algorithm used to combine the PIC and the incoming calling line identity number would preferably be determined by the manufacturer, and so would not necessarily be unique to each phone. However, increased security would be provided by an algorithm which is unique to each phone.

The received security number is then compared with the stored security number and if these numbers are not equivalent to one another, the incoming message is rejected. However, if the two numbers are equivalent, then the message is accepted, and processed by the mobile telephone.

Accordingly, embodiments of the present invention can provide a mobile telephone which can enable secure access to information provided by the mobile telephone, by storing a security number for a particular calling station in a telephone book entry in the phone book memory of the telephone. Since the combining algorithm and the security number are confidential to the mobile telephone user, heightened security is possible.

What is claimed is:

1. A method of operating a mobile telephone comprising, in the mobile telephone:

receiving a data message from a caller, the data message including identity data, key data and instruction data, the identity data relating to the identity of the caller and the key data relating to the mobile telephone;

combining the identity data and key data to produce received security data;

obtaining stored security data from a memory of the mobile telephone on the basis of the received identity data;

comparing the received security data with the stored security data; and processing the instruction data if the received security data is equivalent to the stored security data, or rejecting the instruction data if the received and stored security data are not equivalent.

2. A method as claimed in claim 1, wherein the message data is in the form of a GSM short message and the stored security data is stored in a user accessible storage area of the mobile telephone.

3. A method as claimed in claim 2, wherein the storage area is telephone book memory for storing caller identity data and associated stored security data.

4. A method as claimed in claim 1, 2, or 3, wherein the identity data and key data are combined by the use of an algorithm uniquely associated with the mobile telephone.

5. A mobile telephone comprising:

reception means for receiving message data including identity data, key data and instruction data from a caller, the identity relating to the caller and the key data relating to the mobile telephone;

memory means for storing caller identity data and associate stored security data;

data processing means for combining received identity and key data to produce received security data; and comparison means for comparing the received security data with stored security data relating to the received identity data, and for processing the instruction data if the received security data is equivalent to the stored security data, or for rejecting the instruction data if the received and stored security data are not equivalent.

6. A mobile telephone as claimed in claim 5, wherein the message data is in the form of a GSM short message and the stored security data is stored in a user accessible storage area.

7. A mobile telephone as claimed in claim 6, wherein the storage area is a telephone book memory of the mobile telephone, the telephone book memory storing caller identity data and associated stored security data.

8. A mobile telephone as claimed in claim 4, wherein the data processing means operates in accordance with an algorithm uniquely associated with the mobile telephone.

* * * * *